United States Patent [19]

Chattha et al.

[11] Patent Number: 5,102,853
[45] Date of Patent: * Apr. 7, 1992

[54] THREE-WAY CATALYST FOR AUTOMOTIVE EMISSION CONTROL

[75] Inventors: Mohinder S. Chattha, Northville, Mich.; William L. W. Watkins, Toledo, Ohio; Haren S. Gandhi, Farmington Hills, Mich.

[73] Assignee: Ford Motor Company, Dearborn, Mich.

[*] Notice: The portion of the term of this patent subsequent to Feb. 12, 2008 has been disclaimed.

[21] Appl. No.: 440,525

[22] Filed: Nov. 22, 1989

[51] Int. Cl.$^5$ .............. B01J 21/04; B01J 21/06; B01J 23/44
[52] U.S. Cl. ................... 502/333; 502/350; 502/351; 502/339; 423/213.5
[58] Field of Search ............ 502/333, 350, 351, 339; 423/213.5

[56] References Cited

U.S. PATENT DOCUMENTS

| | | | |
|---|---|---|---|
| 3,380,934 | 4/1968 | Batzold | 502/350 |
| 4,108,218 | 8/1978 | Estes et al. | 502/305 |
| 4,123,391 | 10/1978 | Noguchi et al. | 423/213.5 |
| 4,207,169 | 6/1980 | Courty et al. | 502/333 |
| 4,350,613 | 9/1982 | Nishino et al. | 423/247 |
| 4,504,598 | 3/1985 | Ono et al. | 423/213.5 |
| 4,650,782 | 3/1987 | Onal | 502/333 |
| 4,774,219 | 9/1988 | Boxhoorn et al. | 502/227 |
| 4,833,114 | 5/1989 | Takao | 502/333 |
| 4,835,126 | 5/1989 | Wachs et al. | 502/350 |
| 4,847,234 | 6/1989 | Hums | 502/340 |
| 4,849,399 | 7/1989 | Joy, III et al. | 502/333 |
| 5,021,389 | 6/1991 | Chattha et al. | 502/303 |
| 5,493,905 | 1/1995 | Beuther et al. | 502/325 |

Primary Examiner—Anthony McFarlane
Attorney, Agent, or Firm—Joseph W. Malleck; Roger L. May

[57] ABSTRACT

A three-way catalyst for automotive emission control having a mechanical carrier having a support comprised substantially of alumina, a catalytic compound supported on said carrier having a major constituent of palladium, and a discontinuous phase of titanium oxide on or adjacent substantially each exposed particle of the catalytic compound.

A method of making a three-way catalyst for automotive emission control, comprising: impregnating with palladium a mechanical carrier having a support comprised substantially of alumina to produce a composite having 0.05-5.0% palladium; and impregnating the composite with an organo-titanium compound and decomposing such impregnated compound to form a discontinuous titanium oxide phase on or adjacent the exposed portions of said composite.

19 Claims, 3 Drawing Sheets

THREE-WAY CATALYST FOR AUTOMOTIVE EMISSION CONTROL

BACKGROUND OF THE INVENTION

1. Technical Field

This invention relates to the art of making catalysts for treating automotive emissions, and more particularly to three-way catalysts that have high conversion efficiency for hydrocarbons, carbon monoxide, and nitrogen oxides

2. Discussion of the Prior Art

Precious metals, including palladium, have been used as active catalyst materials in automotive emission devices. However, palladium, by itself, as the dominant or sole catalyst material, is limited in its effectiveness to promote the reduction of nitrogen oxide compounds at high temperatures and is not optimum in promoting oxidation of hydrocarbons at such temperatures. An example of palladium usage is disclosed in U.S. Pat. No. 4,123,391. A variety of cost-increasing alternatives have been used to augment the capabilities of palladium, primarily by the use of other precious metals.

This invention has discovered that small amounts of titania (a nonprecious metal) uniquely applied will synergistically cooperate with palladium to enhance the total catalytic effect for oxidation and reduction, particularly at high temperatures. Titania has not been used heretofore as a catalyst enhancing ingredient. Titania has been incorporated in catalyst support materials for purposes of stabilizing such support materials, but prevented from entering into the catalytic process by coverings of other catalytically active ingredients over the titania (see U.S. Pat. Nos. 4,504,598 and 4,123,391). In some cases, titania has been layered on the support in large amounts prior to being covered with the catalytically active material (see U.S. Pat. No. 4,350,613).

Straight titania has been slurried onto prevalent precious metal materials (including palladium) in a thin uncovered continuous film (of about 0.003–0.01 inches thick) to make an oxidation catalyst more lead tolerant (see U.S. Pat. No. 4,650,782). Such catalyst construction was not intended for enhancement of reduction processes, did not function as a reducing catalyst, and, because of its continuity, found no special catalytic synergism between titania and palladium.

SUMMARY OF THE INVENTION

This invention is a three-way catalyst construction, including its method of making, which deploys titania in a unique manner.

The three-way catalyst construction for automotive emission control herein comprises: (a) a mechanical carrier having a support comprised substantially of alumina; (b) a catalytic compound supported on the carrier having a major constituent of palladium; and (c) a discontinuous phase of titanium oxide on or adjacent substantially each exposed particle of catalytic compound. The term "support" is used throughout this specification to mean a material having a large surface per unit volume and having good adhesion of precious metals thereto. The term "carrier" is used to mean a material having a relatively low surface area per unit volume due to larger particles and little or no adhesion of precious metals thereto. The term "catalyst" is used to mean the combination of support, catalyst compound and titania, but not including the carrier.

Preferably, the catalytic compound forms 0.05–5.0% of the total weight of the catalyst, and such catalytic compound may contain platinum up to 45% of the compound. Preferably, the discontinuous phase of titania is a washcoat constituting up to 8% of the total weight of the catalyst, no greater than about 40% of the surface area of each exposed particle of the catalytic compound is covered by the discontinuous phase of titanium oxide. Advantageously, the discontinuous phase of titania covers 2–20% of the catalytic compound and is 0.1–8.0% of the total weight of the catalyst.

The method of this invention comprises: (a) impregnating with palladium a mechanical carrier having a support comprised substantially of alumina to produce a composite having 0.05–5.0% palladium by weight; (b) impregnating the composite with an organo-titanium compound and decomposing such impregnated compound to form a discontinuous titanium oxide phase on the exposed portions of the composite.

Preferably, the organo-titanium compound is titanium butoxide and is dissolved in a liquid for wetting the composite, the wetted composite being calcined at a temperature of 400°–600° C. for 4–12 hours. Such calcination is staged, to include heating to 250°–280° C. for 1½ to 2½ hours and thence heating to 400°–600° C. for 5–10 hours.

DETAILED DESCRIPTION AND BEST MODE

Figure 1:
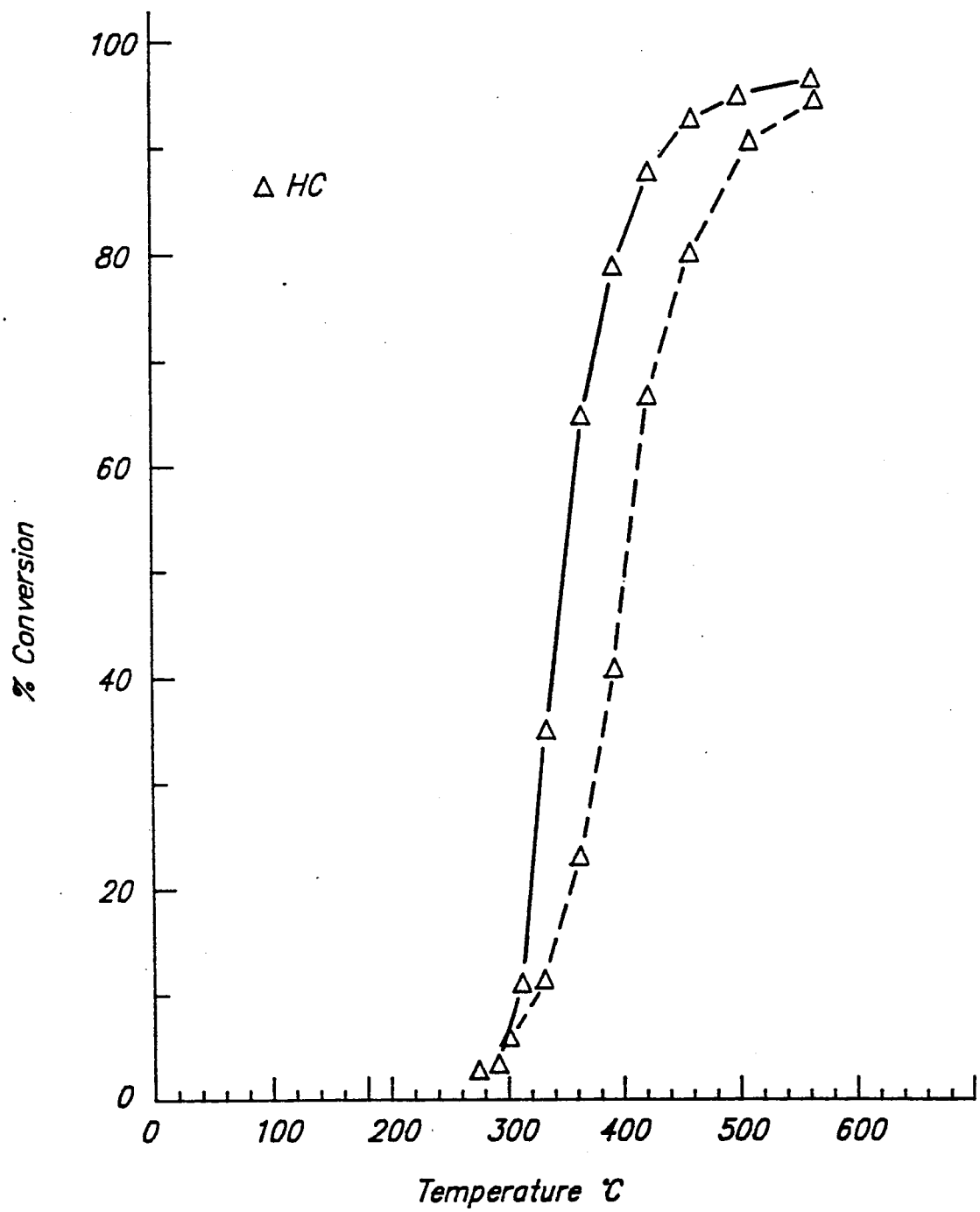
FIG. 1 is a graphical illustration of hydrocarbon conversion efficiency plotted as a function of temperature for a catalyst construction in accordance with this invention (shown in full-line) and for a typical prior art construction lacking the titania improvement herein (shown in broken-line)

The three-way catalyst of this invention consists essentially of a mechanical carrier having a support comprised substantially of alumina, a catalytic compound discontinuously supported on the support having a major constituent of palladium, and a discontinuous phase of titanium oxide on or adjacent a substantial number of exposed particles of the catalytic compound.

The mechanical carrier is preferably comprised of a monolithic silicate structure (i.e., cordierite) in a honeycomb, although the configuration of which is not critical to the catalyst of this invention. The volume of the carrier structure is measured by its exterior dimensions. It is preferred that the micropore volume of the carrier material be relatively low and the macropore volume provide at least about 90% with pore diameters greater than 2000 angstroms. The surface area of the carrier, as opposed to the material of which the structure is made, should be maximized consistent with pressure drop limitations for the particular application of the catalytic system of this invention. It is preferred that the surface area of the monolithic structure provide 50–1000 m² per liter of structure, as measured by $N_2$ adsorption. Cell density should be maximized consistent with pressure drop limitations and is preferably in the range of 200-800 cells per square inch of cross-sectional area of the structure.

Alumina must be the dominant or substantial ingredient of the support material or washcoat (greater than 50% by weight) because of its high surface area, strong adhesion, and low metal support interaction. Low metal interaction means it does not dissolve precious metals or cover them completely, thus making them inaccessible to reacting gases. It is desirable to form a slurry of gamma alumina particles, which may contain other alumina phases, and palladium salt particles to form Pd coated $Al_2O_3$ particles upon drying and calcination of such slurry. The particles of such drying and calcination receive the discontinuous phase of titanium oxide to form a collection of specially decorated particles which are eventually applied as a coating to the carrier or monolithic structure heretofore described. The specially coated alumina particles can be deposited on the monolithic carrier by any conventional or convenient means. Typical of such means is by dipping the carrier in a slurry of such specially decorated alumina particles. It is preferred that the decorated alumina particles form a washcoat deposit in the form of a film of about 0.0003-0.01 inches thick. It is also preferred that the alumina-based particles be present on the monolithic carrier in amounts in the range from about 400 to about 10,000 grams per cubic foot of carrier, where the volume is measured by the exterior dimensions of the monolithic carrier structure.

Alternatively, palladium may be applied directly to a previously alumina coated monolith structure, as a first discontinuous coating, and a discontinuous phase of titanium oxide applied over the palladium coated structure.

The catalytic compound of the present invention comprises a major constituent of palladium supported on the alumina. Palladium must be present in an amount of at least 55% by weight of the precious metal. Platinum may be present in such precious metal in an amount up to about 45% and may include other components which act as stabilizers and/or interspersants, which are well known in the art. Additionally, other components known to be beneficial in the oxidation of automotive exhaust gases may be present in minor amounts in the catalyst of the instant invention such as $CaO$, $Zr_2O_3$, $NiO$, and $Fe_2O_3$. If Pd is present in excess of 5% (wt.), it will be excessively expensive and at some point will aggregate or form a more continuous coating over the $Al_2O_3$ which detracts from catalytic activity.

The discontinuous titania phase is intended to mean herein primarily the stable oxide form of $TiO_2$, but other forms such as $TiO$, $Ti_2O_3$, $Ti_3O_5$, and $Ti_2O$ may be present in minor proportions of less than 2%. Titanium oxide may constitute up to 8% of the total weight of the catalyst. Discontinuous phase is meant herein that the phase covers up to 40%, preferably 2-20%, of the grain surface of the catalytic compound and is up to 8%, preferably 0.1-2.0%, of the total weight of the catalyst.

If $TiO_2$ is present in an amount greater than 8% by weight, the phase exhibits some continuous areas and conversion efficiency is seriously affected. If present in an amount less than 0.1% by weight, the ability of $TiO_2$ to supply oxygen to Pd is eliminated or becomes negligible.

The method of making the three-way catalyst comprises (a) impregnating with palladium an alumina washcoat or support comprised substantially of alumina to produce a composite having 0.05-5.0% palladium; (b) impregnating the composite with an organo-titanium compound and decomposing such impregnated compound to form a discontinuous titanium oxide phase on the exposed portions of the composite.

The palladium applied to the support or washcoat may be added in a diluted palladium nitrate solution with the amount of acid being regulated to achieve a pH of 3-5. The coated support or washcoat is dried after being wetted with such acid and calcined at a temperature in the range of 400°-600° C.

The organo-titanium compound is selected from a group consisting of organo-titanates. A preferred example of such compound is butoxide, characterized by $Ti(OC_4H_9\text{-n})_4$. Equivalents to butoxide are many titanium alkoxides. Organo-titanium compounds, particularly titanium butoxide, decompose at lower temperatures, substantially below the decomposition temperature of palladium nitrate.

The organo-titanium compound is applied by dissolving the compound in liquid for wetting the composite, the wetted composite being then calcined at a temperature of about 400°-600° C. for 4-12 hours. Preferably, the calcination is staged to include heating to 250°-280° C. for $1\frac{1}{2}$ to $2\frac{1}{2}$ hours, and thence heating to 400°-600° C. for 5-10 hours.

Figure 3:
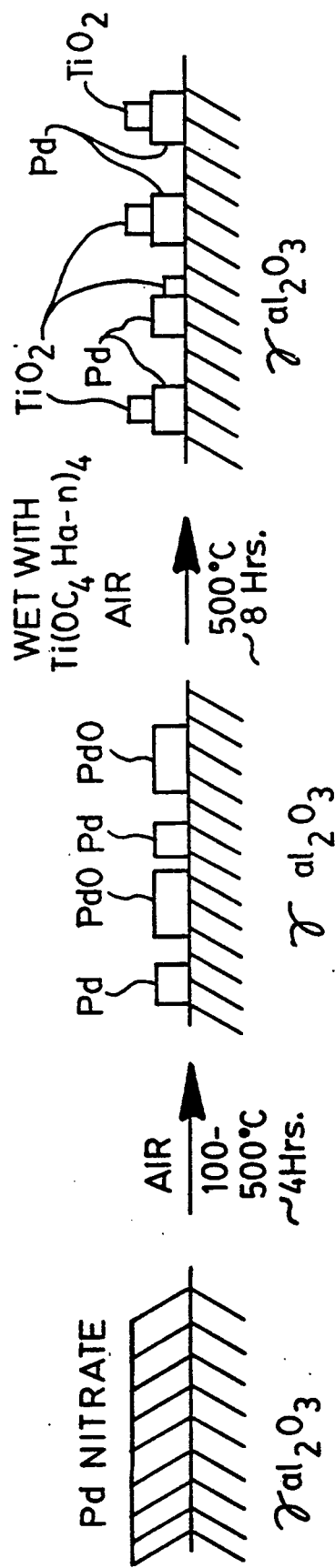
FIG. 3 is a schematic representation of the palladium deposit relationship to the support and to the titania presence.

As shown in FIG. 3, the discontinuous titania coating covers no greater than 40% of the palladium particles; the palladium may also be discontinuous as shown and thus the titania is deemed discontinuous on or adjacent each exposed particle of catalytic compound. The decomposition products of heat treating palladium nitrate wetted alumina in air are separated crystallites of palladium and palladium oxide. PdO spreads out more on the substrate due to a greater wetting angle and the particles of PdO coalesce more readily than Pd, thereby increasing their volume slightly. Wetting the discontinuous crystallites of Pd and PdO with an organo-titanium compound, and then heating, results in growing of $TiO_2$ on or to the Pd particles. Irregularities in the gamma alumina substrate, such as exposed crystallographic planes, contamination layers, or roughness due to geometry of nucleation sites, decrease the interfacial strength between Pd and gamma alumina and promote even greater discontinuities of the Pd particles.

The amount of organo-titanium compound introduced to the palladium catalyst is critical. The titanium compound must be in the operational range of 0.1-8% by weight of the total catalyst, and preferably is 0.1-2.0%. If the titanium compound is less than 0.1% of the total catalyst, there would be an imperceptible amount of enhancement of the catalytic activity observed. If the titanium compound exceeds 8%, the catalytic activity of palladium would be retarded by the titanium oxide covering a greater percentage of the palladium and reducing its exposure.

The titania compound functions as a catalyst in combination with the palladium to aid in reduction as well as oxidation of the gases within the automotive emissions. The titanium oxide in its discontinuous configuration functions during oxygen-lean conditions of the emission gas to form lower oxides and additional oxygen. This may be represented by the equation: $2\ TiO_2 \rightarrow Ti_2O_3 + \frac{1}{2} O_2$; during rich oxygen spikes of the emission gas, a reducing condition occurs where di-titanium trioxide combines with oxygen to form titanium dioxide represented by the formula: $Ti_2O_3 + \frac{1}{2} O_2 \rightarrow 2\ TiO_2$.

Figure 2:
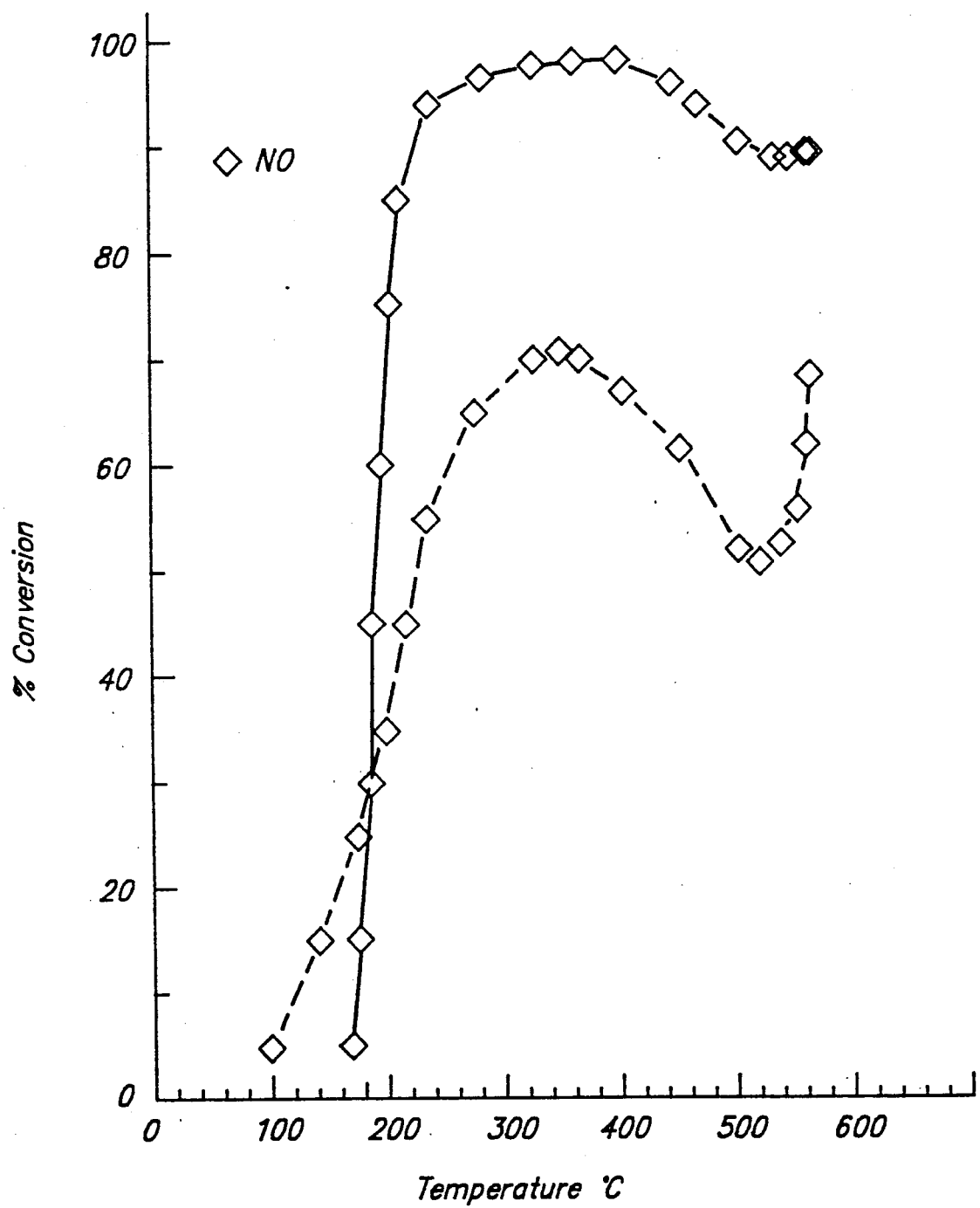
FIG. 2 is a graphical illustration of nitrogen oxide conversion efficiency plotted as a function of temperature for a catalyst construction in accordance with this invention (shown in full-line) and for a typical prior art construction lacking the titania improvement herein (shown in broken-line)

As shown in FIG. 1, the conversion efficiency (solid line) of oxidizing hydrocarbons is substantially greater in the temperature range of 300°–500° C. than that compared for a palladium catalyst devoid of titanium dioxide (dashed line). As shown in FIG. 2, the nitric oxide reduction conversion efficiency is substantially greater for the catalyst of this invention (solid line) throughout the temperature range of 200°–600° C. as compared to the reduction capability of a palladium catalyst without titanium dioxide (dashed line).

Thus, the unique introduction of a discontinuous titania phase to a palladium catalyst supported on alumina enhances the high temperature catalysis of both reduction and oxidation of nitric oxide and hydrocarbons, and also reduces the light-off temperature for the catalyst in an amount of 5°–50° C.

pares a different mode of applying slurries. Sample 5 compares added presence of conventional oxides. Samples 11 and 12 compare excessive and too lean contents of $TiO_2$. Samples 6 and 7 compare respectively the presence of added Pt and replacement of Pd by Pt. Sample 8 compares the catalytic activity utilizing a different organo-titanium compound. Samples 9 and 10 compare increasing amounts of Pd, and sample 13 the use of rapid heating.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

TABLE I

| | | | Conversion Efficiency | | | |
|---|---|---|---|---|---|---|
| Sample | Chemistry | Parameter Variation | % HC at 350° C. | % HC at 400° C. | % NO at 250° C. | % NO at 400° C. |
| 1. | $Al_2O_3$/1% Pd/1.2% $TiO_2$ | all ingredients applied as a slurry; butoxide used for discontinuous $TiO_2$ | 57 | 82 | 94 | 97 |
| 2. | $Al_2O_3$/1% Pd/0% $TiO_2$ | no butoxide used and no titania present | 21 | 56 | 59 | 64 |
| 3. | Fe/1% Pd/1.2% $TiO_2$ | same as 1 except stainless steel mesh metal substrate used | 43 | 71 | 79 | 82 |
| 4. | $Al_2O_3$/1% Pd/1.2% $TiO_2$ | same as 1 except $Al_2O_3$ applied as a separate support slurry | 56 | 82 | 93 | 96 |
| 5. | $Al_2O_3$/.5 $CeO_2$/ 1.0% Pd/1.2% $TiO_2$ | same as 1 except $CeO_2$ present in slurry for support | 55 | 80 | 91 | 92 |
| 6. | $Al_2O_3$/1% Pd/.5% Pt/ 1.2% $TiO_2$ | same as 1 except Pt added | 61 | 84 | 95 | 98 |
| 7. | $Al_2O_3$/1% Pt/1.2% $TiO_2$ | same as 1 except Pt replaces Pd | 59 | 83 | 72 | 79 |
| 8. | $Al_2O_3$/1% Pd/1.2% $TiO_2$ | same as 1. except different organo-titanium compound used | 56 | 83 | 93 | 98 |
| 9. | $Al_2O_3$/5% Pd/1.2% $TiO_2$ | greater Pd | 63 | 85 | 92 | 96 |
| 10. | $Al_2O_3$/8% Pd/1.2% $TiO_2$ | excessive Pd | 49 | 77 | 79 | 82 |
| 11. | $Al_2O_3$/1% Pd/9% $TiO_2$ | greater $TiO_2$ | 41 | 62 | 67 | 81 |
| 12. | $Al_2O_3$/1% Pd/.03% $TiO_2$ | lesser $TiO_2$ | 33 | 61 | 67 | 72 |
| 13. | $Al_2O_3$/1% Pd/1.2% $TiO_2$ | rapid rather than stepped heating of slurry | 50 | 80 | 83 | 87 |

To show the importance of process and chemical content variations, several samples were run; the data generated thereby is shown in Table I.

Each of the samples involved impregnating gamma alumina by incipient wetness, with a palladium nitrate solution to produce a 1% palladium/alumina composition. It was dried overnight at 100° C. For those samples employing a discontinuous titania phase, a solution of 0.95 grams of titanium butoxide was prepared in 15 milliliters of ethanol and 10 grams of a 1% palladium/alumina composition was added to it. The mixture was stirred to mix it thoroughly and was then placed in an oven at 95° C. to evaporate ethanol. The titania-modified material and the starting palladium/alumina composition were heated in an oven at 280° C. for one hour and then at 600° C. for six hours. The catalytic activity of these materials for propane oxidation and NO reduction was determined in a flow reactor (1% $H_2$, 1000 ppm NO, space velocity 30K $hr^{-1}$ for $NO_x$ test, and 2% $O_2$, 500 ppm $C_3H_8$ at 30K $hr^{-1}$ for HC test). Samples 1 and 2 compare the catalytic activity with and without the use of an organo-titanium compound. Sample 3 compares use of a non-alumina substrate. Sample 4 com-

What is claimed:

1. A three-way catalyst for automotive emission control, comprising:
   (a) a mechanical carrier having a support comprised substantially of alumina;
   (b) a catalytic compound on said support having a major constituent of palladium particles; and
   (c) a discontinuous phase of titanium oxide substantially on or adjacent each exposed particle of said catalytic compound.

2. The catalyst as in claim 1, in which said carrier is a honeycomb-shaped monolith of cordierite of which alumina is the dominant support phase.

3. The catalyst as in claim 1, in which said discontinuous titania phase is a washcoat constituting up to 8% of the total weight of the catalyst.

4. The catalyst as in claim 3, in which said catalytic compound forms 0.05–5.0% of the total weight of the catalyst.

5. The catalyst as in claim 4, in which said catalytic compound contains palladium which is at least 55% of the weight of the compound.

6. The catalyst as in claim 1, in which no greater than 40% of the surface area of each exposed particle of catalytic compound is covered by said titanium oxide phase.

7. The catalyst as in claim 1, in which said discontinuous titania phase covers 2–20% of said catalytic compound.

8. The catalyst as in claim 1, in which said discontinuous titania phase is 0.1–8.0% of the total weight of the catalyst.

9. The catalyst as in claim 1, in which said discontinuous titania phase is 0.1–2.0% of the total weight of the catalyst.

10. A method of making a three-way catalyst for automotive emission control, comprising:
  (a) impregnating with palladium a mechanical carrier having a support comprised substantially of alumina to produce a composite having 0.05–5.0% palladium with portions of said palladium exposed; and
  (b) impregnating the composite with an organo-titanium compound and decomposing such impregnated compound to form a discontinuous titanium oxide phase on or adjacent the exposed portions of said composite.

11. The method as in claim 10, in which (i) palladium is added in a diluted palladium nitrate solution, with the amount of said acid being regulated to achieve pH of 3–5 and a discontinuous Pd coating, and (ii) after drying the carrier wetted with said acid, calcining the composite at a temperature in the range of 400°–600° C.

12. The method as in claim 10, in which said organo-titanium compound is dissolved in a liquid for wetting said composite, said wetted composite being calcined at a temperature of 400°–600° C. for 4–12 hours.

13. The method as in claim 12, in which said calcination is staged to include heating to 250°–280° C. for $1\frac{1}{2}$ to $2\frac{1}{2}$ hours, and thence heating to 400°–600° C. for 5–10 hours.

14. The method as in claim 10, in which said support is coated prior to or simultaneously with step (a), with an oxide to aid dispersement of the catalyst compound or stabilization of the carrier.

15. The method as in claim 14, in which said oxide is selected from the group consisting of an oxide of cerium, zirconium, barium, calcium and iron.

16. The method as in claim 10, in which said carrier is a honeycomb-shaped monolith of cordierite, of which alumina is the dominant support coating.

17. The method as in claim 10, in which said support is a collection of aggregates/prepared by (i) wetting a particulate source of alumina with dilute nitric acid to form a slurry, (ii) drying said slurry to form a cake, and (iii) crushing said cake to an average particle size of 20–40 mesh and then ball milling the slurry before application to the carrier.

18. The method as in claim 10, in which said discontinuous titanium in said oxide is tetravalent.

19. The method as in claim 10, in which said organo-titanium compound is titanium butoxide.

* * * * *